(12) United States Patent
Klawer et al.

(10) Patent No.: US 11,680,633 B2
(45) Date of Patent: Jun. 20, 2023

(54) CHAINRING

(71) Applicant: Fox Factory, Inc., Duluth, GA (US)

(72) Inventors: Paul Klawer, North Vancouver (CA); Wesley E. Allinger, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 322 days.

(21) Appl. No.: 16/784,675

(22) Filed: Feb. 7, 2020

(65) Prior Publication Data

US 2020/0256446 A1 Aug. 13, 2020

Related U.S. Application Data (60) Provisional application No. 62/803,250, filed on Feb. 8, 2019.

(51) Int. Cl.
*F16H 55/30* (2006.01)
*B62M 9/02* (2006.01)

(52) U.S. Cl.
CPC .............. *F16H 55/30* (2013.01); *B62M 9/02* (2013.01)

(58) Field of Classification Search
CPC ...... F16H 55/30; F16H 55/303; B62M 9/105; B62M 9/10
USPC ......................................... 474/152, 156, 160
See application file for complete search history.

(56) References Cited

U.S. PATENT DOCUMENTS

| | | | |
|---|---|---|---|
| 2,451,690 A | 10/1948 | Oehler | |
| 2,468,011 A | 4/1949 | Hazel | |
| 2,793,571 A | 5/1957 | Way et al. | |
| 3,168,836 A * | 2/1965 | Militana | F16H 55/12 474/902 |
| 3,200,665 A | 8/1965 | Martin | |
| 3,272,027 A | 9/1966 | Wayman | |
| 3,304,796 A | 2/1967 | Leege | |
| 3,371,549 A | 3/1968 | Ernst | |
| 3,815,439 A * | 6/1974 | Tarutani | B62M 9/10 474/144 |
| 3,903,754 A * | 9/1975 | Morroni | B62M 3/003 74/594.1 |
| 3,905,248 A | 9/1975 | Peyrard | |
| 3,987,539 A | 10/1976 | Gravener | |

(Continued)

FOREIGN PATENT DOCUMENTS

| | | |
|---|---|---|
| CA | 2964058 A1 | 10/2017 |
| CN | 1830722 A | 9/2006 |

(Continued)

OTHER PUBLICATIONS

Chinese First Action and Search Report, App No. 201710232829.8, 12 Pages, dated Feb. 3, 2020.

(Continued)

*Primary Examiner* — Henry Y Liu (57) ABSTRACT

A chainring is disclosed herein. The chainring includes a front surface, a back surface, a center, and an outer diameter. The chainring has a thickness which varies from a lesser thickness at the outer diameter to a greater thickness nearer the center. The thickness of the chainring varying substantially the same on the front surface and the back surface such that the chainring is substantially symmetric about a plane dividing the front surface and the back surface along a direction normal to an axial direction of the chainring.

12 Claims, 8 Drawing Sheets

(56) References Cited

U.S. PATENT DOCUMENTS

| | | | |
|---|---|---|---|
| 4,144,773 A * | 3/1979 | Addicks | B62M 9/105 |
| | | | 74/DIG. 10 |
| 4,174,642 A | 11/1979 | Martin et al. | |
| 4,240,303 A | 12/1980 | Mosley | |
| 4,261,214 A | 4/1981 | Watanabe et al. | |
| RE30,758 E * | 10/1981 | Lang | B62M 25/08 |
| | | | 280/236 |
| 4,318,310 A | 3/1982 | Segawa | |
| 4,331,043 A | 5/1982 | Shimano | |
| 4,358,967 A * | 11/1982 | Kastan | B62K 19/34 |
| | | | 74/594.1 |
| 4,392,841 A * | 7/1983 | Juy | B62M 9/10 |
| | | | 474/82 |
| 4,439,172 A * | 3/1984 | Segawa | B62M 9/105 |
| | | | 74/447 |
| 4,446,753 A | 5/1984 | Nagano | |
| 4,453,924 A | 6/1984 | Sugino | |
| 4,475,894 A * | 10/1984 | Sugino | B62M 9/105 |
| | | | 474/144 |
| 4,545,691 A | 10/1985 | Kastan et al. | |
| 4,583,422 A * | 4/1986 | Boyd | B62M 9/105 |
| | | | 280/260 |
| 4,586,914 A | 5/1986 | Nagano | |
| 4,594,910 A | 6/1986 | Nagano | |
| 4,598,608 A | 7/1986 | Ueno | |
| 4,608,878 A * | 9/1986 | Shimano | B62M 9/00 |
| | | | 74/594.2 |
| 4,722,722 A | 2/1988 | Rampe | |
| 4,867,733 A | 9/1989 | Yamanoi et al. | |
| 4,889,521 A | 12/1989 | Nagano | |
| 5,003,840 A * | 4/1991 | Hinschlager | B62J 23/00 |
| | | | 74/609 |
| 5,192,248 A | 3/1993 | Nagano | |
| 5,192,249 A | 3/1993 | Nagano | |
| 5,224,903 A | 7/1993 | Langhof et al. | |
| 5,226,469 A | 7/1993 | Matsumura et al. | |
| 5,246,402 A * | 9/1993 | Romano | B62M 9/105 |
| | | | 474/160 |
| 5,285,701 A * | 2/1994 | Parachinni | B62M 3/003 |
| | | | 474/69 |
| 5,362,278 A | 11/1994 | Bergles et al. | |
| 5,413,534 A | 5/1995 | Nagano | |
| 5,451,198 A | 9/1995 | Lancaster | |
| 5,738,603 A | 4/1998 | Schmidt et al. | |
| 5,830,096 A | 11/1998 | Schmidt et al. | |
| 5,852,954 A | 12/1998 | Yamanaka | |
| 5,908,364 A | 6/1999 | Tanaka | |
| 5,935,033 A * | 8/1999 | Tseng | B62M 9/105 |
| | | | 474/155 |
| 5,947,852 A | 9/1999 | Moretz | |
| 5,984,817 A | 11/1999 | Schulz | |
| 6,007,442 A | 12/1999 | Schmidt | |
| 6,013,001 A | 1/2000 | Miyoshi | |
| 6,022,284 A * | 2/2000 | Bartolozzi | B62M 9/105 |
| | | | 474/122 |
| 6,102,821 A | 8/2000 | Nakamura | |
| 6,202,506 B1 | 3/2001 | Storck et al. | |
| 6,203,462 B1 | 3/2001 | Takamori | |
| 6,564,675 B1 | 5/2003 | Jiang | |
| 6,572,500 B2 | 6/2003 | Tetsuka | |
| 6,656,072 B2 | 12/2003 | Sugita et al. | |
| 6,666,786 B2 | 12/2003 | Yahata | |
| 6,755,095 B2 | 6/2004 | Yamanaka | |
| 6,860,171 B1 | 3/2005 | Nanko et al. | |
| 7,080,574 B2 | 7/2006 | Chang | |
| 7,263,914 B2 | 9/2007 | Ording et al. | |
| 7,267,030 B2 * | 9/2007 | French | B62M 3/00 |
| | | | 74/594.1 |
| 7,462,120 B1 * | 12/2008 | Thompson | B62M 9/105 |
| | | | 474/160 |
| 7,503,864 B2 | 3/2009 | Nonoshita et al. | |
| 7,530,290 B2 | 5/2009 | Lin | |
| 7,610,832 B2 | 11/2009 | Guiseppe et al. | |
| 7,686,721 B2 * | 3/2010 | Tabe | B62M 9/105 |
| | | | 474/116 |
| 7,699,733 B2 | 4/2010 | Sakura et al. | |
| 7,713,156 B2 | 5/2010 | Sakura et al. | |
| 7,753,815 B2 | 7/2010 | Saifuddin et al. | |
| 7,824,287 B2 | 11/2010 | Nonoshita et al. | |
| 7,850,564 B2 | 12/2010 | Nonoshita | |
| 7,883,437 B2 | 2/2011 | Braedt | |
| 7,942,771 B2 | 5/2011 | Kamada | |
| 7,967,709 B2 | 6/2011 | Emura et al. | |
| 3,025,304 A1 | 9/2011 | Smith | |
| 8,057,338 B2 | 11/2011 | Kamada | |
| 8,070,632 B2 | 12/2011 | Yuan | |
| 8,096,908 B2 | 1/2012 | Oishi et al. | |
| 8,226,511 B2 | 7/2012 | Kamada | |
| 8,298,104 B2 | 10/2012 | Sakura | |
| 8,479,610 B2 | 7/2013 | Valle et al. | |
| 8,550,944 B2 * | 10/2013 | Esquibel | B62M 9/10 |
| | | | 474/160 |
| 8,573,093 B2 | 11/2013 | Valle et al. | |
| 8,616,084 B2 | 12/2013 | Meggiolan | |
| 8,820,192 B2 | 9/2014 | Staples et al. | |
| 8,882,619 B2 | 11/2014 | Braedt | |
| 8,888,631 B2 | 11/2014 | Morita | |
| 9,016,169 B2 | 4/2015 | Sugimoto et al. | |
| 9,033,835 B2 * | 5/2015 | Blank | B62M 9/10 |
| | | | 474/152 |
| 9,302,733 B2 | 4/2016 | Schlanger | |
| 9,302,736 B2 | 4/2016 | Iwai et al. | |
| 9,308,967 B2 | 4/2016 | Braedt | |
| 9,328,814 B2 | 5/2016 | Wesling et al. | |
| 9,415,835 B2 | 8/2016 | Tokuyama et al. | |
| 9,440,706 B2 | 9/2016 | Iwai et al. | |
| 9,463,844 B2 * | 10/2016 | Fukunaga | B62M 9/10 |
| 9,493,211 B2 | 11/2016 | Reiter et al. | |
| 9,540,070 B2 | 1/2017 | Watarai et al. | |
| 9,580,144 B2 | 2/2017 | Bernardele | |
| 9,631,714 B2 | 4/2017 | Watarai et al. | |
| 9,677,658 B2 | 6/2017 | Wickliffe | |
| 9,719,590 B2 * | 8/2017 | Reiter | B62M 9/10 |
| 9,725,133 B2 | 8/2017 | Staples et al. | |
| 9,791,033 B2 | 10/2017 | Wickliffe et al. | |
| 9,869,382 B2 | 1/2018 | Wesling et al. | |
| 9,914,502 B2 | 3/2018 | Wu | |
| 9,919,763 B2 | 3/2018 | Iwai et al. | |
| 9,926,038 B2 | 3/2018 | Fukunaga et al. | |
| 9,932,090 B2 | 4/2018 | Yoshida et al. | |
| 9,944,351 B2 | 4/2018 | Braun et al. | |
| 9,963,196 B2 * | 5/2018 | Sugimoto | F16H 55/303 |
| 9,994,285 B2 * | 6/2018 | Tokuyama | F16H 55/30 |
| 10,040,510 B2 | 8/2018 | Sugimoto et al. | |
| 10,053,186 B2 * | 8/2018 | Braedt | B25B 27/0071 |
| 10,059,400 B2 | 8/2018 | Tokuyama et al. | |
| 10,155,566 B2 * | 12/2018 | Sugimoto | B62M 9/105 |
| 10,221,887 B2 * | 3/2019 | Dubois | F16C 25/06 |
| 10,358,186 B2 * | 7/2019 | Sugimoto | B62M 9/105 |
| 10,359,106 B2 * | 7/2019 | Akanishi | B62M 9/10 |
| 10,359,107 B2 * | 7/2019 | Young | F16H 55/30 |
| 10,377,445 B2 | 8/2019 | Hirose et al. | |
| 10,407,127 B2 * | 9/2019 | Sugimoto | B62M 9/12 |
| 10,443,685 B2 | 10/2019 | Reiter | |
| 10,507,888 B2 | 12/2019 | Sugimoto | |
| 10,550,925 B2 * | 2/2020 | Akanishi | B62M 9/00 |
| 10,562,589 B2 | 2/2020 | Sugimoto et al. | |
| 10,578,201 B2 | 3/2020 | Reiter et al. | |
| 10,800,482 B2 | 10/2020 | Staples et al. | |
| 10,864,963 B2 | 12/2020 | Staples et al. | |
| 10,994,804 B2 | 5/2021 | Sugimoto | |
| 11,014,628 B2 | 5/2021 | Choltco-Devlin et al. | |
| 11,130,546 B2 | 9/2021 | Staples et al. | |
| 2002/0086753 A1 | 7/2002 | Yahata | |
| 2003/0097900 A1 | 5/2003 | Yamanaka | |
| 2003/0199351 A1 | 10/2003 | Nichols | |
| 2004/0070166 A1 | 4/2004 | Valle | |
| 2004/0092352 A1 | 5/2004 | Chiang | |
| 2004/0200314 A1 | 10/2004 | Hermansen et al. | |
| 2004/0204274 A1 | 10/2004 | Young | |
| 2005/0009656 A1 | 1/2005 | Preis et al. | |

(56) References Cited

U.S. PATENT DOCUMENTS

| | | | |
|---|---|---|---|
| 2005/0014590 A1* | 1/2005 | Wen | B62M 9/00 |
| | | | 474/160 |
| 2005/0032596 A1* | 2/2005 | Nonoshita | B62K 19/16 |
| | | | 474/178 |
| 2005/0039570 A1 | 2/2005 | Nanko et al. | |
| 2005/0072264 A1 | 4/2005 | Yamanaka | |
| 2005/0081678 A1 | 4/2005 | Smith | |
| 2005/0090349 A1 | 4/2005 | Lee | |
| 2005/0199092 A1 | 9/2005 | Feltrin et al. | |
| 2005/0233850 A1* | 10/2005 | Andel | B62M 9/00 |
| | | | 474/202 |
| 2005/0282671 A1 | 12/2005 | Emura et al. | |
| 2005/0282672 A1* | 12/2005 | Nonoshita | B62M 9/105 |
| | | | 474/174 |
| 2006/0205549 A1* | 9/2006 | Nonoshita | B62M 9/105 |
| | | | 474/160 |
| 2006/0210734 A1 | 9/2006 | Lin | |
| 2006/0288819 A1 | 12/2006 | Dal et al. | |
| 2007/0034043 A1 | 2/2007 | Feltrin | |
| 2007/0049437 A1 | 3/2007 | Wickliffe | |
| 2007/0054768 A1 | 3/2007 | Miyazawa | |
| 2007/0111833 A1 | 5/2007 | Young | |
| 2007/0129193 A1 | 6/2007 | Nonoshita et al. | |
| 2007/0137425 A1 | 6/2007 | Dal et al. | |
| 2007/0173364 A1 | 7/2007 | Renshaw | |
| 2007/0186718 A1 | 8/2007 | Chiang | |
| 2007/0199403 A1 | 8/2007 | Ciavatta et al. | |
| 2007/0227293 A1 | 10/2007 | Valle | |
| 2007/0227294 A1 | 10/2007 | Valle | |
| 2007/0265122 A1* | 11/2007 | Emura | B62M 9/105 |
| | | | 474/152 |
| 2007/0270261 A1 | 11/2007 | Sakura et al. | |
| 2007/0283781 A1 | 12/2007 | Meggiolan | |
| 2008/0028887 A1 | 2/2008 | Valle et al. | |
| 2008/0120845 A1 | 5/2008 | Hama | |
| 2008/0176691 A1 | 7/2008 | Saifuddin et al. | |
| 2008/0202284 A1* | 8/2008 | Valle | B62M 3/00 |
| | | | 74/594.1 |
| 2008/0207369 A1 | 8/2008 | Bouchez | |
| 2008/0272572 A1 | 11/2008 | Tsai | |
| 2008/0314193 A1 | 12/2008 | Meggiolan | |
| 2009/0042681 A1 | 2/2009 | Dal et al. | |
| 2009/0042682 A1 | 2/2009 | Dal et al. | |
| 2009/0105024 A1 | 4/2009 | Sakura et al. | |
| 2009/0236777 A1 | 9/2009 | Chiang | |
| 2009/0243160 A1 | 10/2009 | Chiang | |
| 2009/0244337 A1 | 10/2009 | Sakura et al. | |
| 2010/0064845 A1 | 3/2010 | French | |
| 2010/0093494 A1 | 4/2010 | Smith | |
| 2010/0326233 A1 | 12/2010 | Schlanger | |
| 2011/0126666 A1* | 6/2011 | McAinsh | B62M 3/00 |
| | | | 74/594.2 |
| 2011/0167943 A1 | 7/2011 | Lermen et al. | |
| 2011/0251008 A1 | 10/2011 | Schmitz et al. | |
| 2011/0319209 A1 | 12/2011 | Huang et al. | |
| 2012/0172165 A1 | 7/2012 | Schroedl | |
| 2013/0011215 A1 | 1/2013 | Wells | |
| 2013/0087013 A1* | 4/2013 | Sugimoto | B62M 9/105 |
| | | | 74/594.2 |
| 2013/0139642 A1 | 6/2013 | Reiter et al. | |
| 2013/0184110 A1* | 7/2013 | Reiter | F16H 55/30 |
| | | | 474/152 |
| 2014/0335987 A1* | 11/2014 | Iwai | B62M 9/10 |
| | | | 474/152 |
| 2015/0082939 A1* | 3/2015 | Meyer | B62M 3/00 |
| | | | 74/594.2 |
| 2015/0152231 A1 | 6/2015 | Ohki et al. | |
| 2015/0175241 A1 | 6/2015 | Malloy | |
| 2015/0176692 A1* | 6/2015 | Roh | F16H 7/06 |
| | | | 474/156 |
| 2015/0198231 A1 | 7/2015 | Emura | |
| 2015/0210352 A1* | 7/2015 | Sugimoto | B62M 9/105 |
| | | | 474/80 |
| 2015/0210353 A1 | 7/2015 | Tokuyama et al. | |
| 2015/0211623 A1* | 7/2015 | Inui | B23K 15/04 |
| | | | 219/121.64 |
| 2015/0217834 A1* | 8/2015 | Iwai | B62M 9/10 |
| | | | 474/152 |
| 2015/0337943 A1 | 11/2015 | Sugimoto | |
| 2015/0360749 A1* | 12/2015 | Iwai | F16H 55/30 |
| | | | 474/158 |
| 2015/0362057 A1* | 12/2015 | Wesling | F16H 55/30 |
| | | | 474/152 |
| 2016/0114859 A1 | 4/2016 | Tsai et al. | |
| 2016/0272279 A1* | 9/2016 | Yoshida | B62M 9/12 |
| 2017/0029066 A1 | 2/2017 | Fukunaga et al. | |
| 2017/0146109 A1 | 5/2017 | Reiter et al. | |
| 2017/0174288 A1* | 6/2017 | Wu | B62M 9/105 |
| 2017/0183060 A1 | 6/2017 | Braedt | |
| 2017/0234418 A1* | 8/2017 | Barefoot | F16H 55/30 |
| | | | 474/156 |
| 2017/0247081 A1* | 8/2017 | Sugimoto | B62M 9/10 |
| 2017/0274960 A1* | 9/2017 | Dubois | B62M 3/00 |
| 2017/0292598 A1* | 10/2017 | Moore | B62M 9/105 |
| 2018/0037296 A1 | 2/2018 | Hamamoto | |
| 2018/0043203 A1 | 2/2018 | Seol | |
| 2018/0057106 A1* | 3/2018 | Iwai | B62M 3/00 |
| 2018/0079467 A1* | 3/2018 | Hirose | F16H 55/30 |
| 2018/0127057 A1* | 5/2018 | Sugimoto | B62M 9/105 |
| 2018/0134340 A1* | 5/2018 | Emura | B62M 9/12 |
| 2018/0231060 A1 | 8/2018 | Milanesio et al. | |
| 2018/0347680 A1* | 12/2018 | Akanishi | F16H 55/30 |
| 2018/0362113 A1 | 12/2018 | Day | |
| 2019/0017586 A1* | 1/2019 | Sugimoto | B62M 9/105 |
| 2019/0085899 A1 | 3/2019 | Bernardele | |
| 2019/0152558 A1 | 5/2019 | Staples et al. | |
| 2019/0185108 A1 | 6/2019 | Bush et al. | |
| 2019/0210677 A1 | 7/2019 | O'Reilly | |
| 2020/0200253 A1 | 6/2020 | Klawer et al. | |
| 2020/0256446 A1 | 8/2020 | Klawer et al. | |
| 2021/0094652 A1 | 4/2021 | Staples et al. | |

FOREIGN PATENT DOCUMENTS

| | | |
|---|---|---|
| CN | 200999089 Y | 1/2008 |
| CN | 101224782 A | 7/2008 |
| CN | 103133637 A | 6/2013 |
| CN | 107380340 A | 11/2017 |
| DE | 3130258 A1 | 6/1982 |
| DE | 3531030 A1 | 3/1987 |
| DE | 19751879 A1 | 5/1999 |
| DE | 19954432 A1 | 5/2001 |
| DE | 20218755 U1 | 2/2003 |
| DE | 102015005673 A1 | 11/2015 |
| DE | 202017107695 U1 | 3/2018 |
| EP | 0144984 B1 | 4/1989 |
| EP | 0538780 A1 | 4/1993 |
| EP | 1270393 A1 | 1/2003 |
| EP | 1281609 A2 | 2/2003 |
| EP | 1352825 A1 | 10/2003 |
| EP | 1426282 A2 | 6/2004 |
| EP | 1493654 A1 | 1/2005 |
| EP | 1619417 A2 | 1/2006 |
| EP | 1884460 A2 | 2/2008 |
| EP | 1884461 A2 | 2/2008 |
| EP | 2423091 A1 | 2/2012 |
| ES | 2600778 A1 | 2/2017 |
| FR | 904975 A | 11/1945 |
| FR | 946276 A | 5/1949 |
| FR | 2501615 B1 | 4/1986 |
| GB | 2005363 B | 6/1982 |
| JP | H10181662 A | 7/1998 |
| JP | 2005053410 A | 3/2005 |
| TW | 200821216 A | 5/2008 |
| TW | 201530021 A | 8/2015 |
| WO | 2007147909 A1 | 12/2007 |
| WO | 2010136135 A1 | 12/2010 |

OTHER PUBLICATIONS

European Examination Report, European Patent Application No. 17166123.4, 10 Pages, dated Mar. 18, 2020.

(56) References Cited

OTHER PUBLICATIONS

Google Translation of Decision of Rejection for TW Appl. No. 106112061, Feb. 26, 2018 (Year: 2018).
Google Translation of Rejection forTW Appl. No. 106112061, Jul. 30, 2018 (Year 2018).
Inverted trapezoid—Google Search, Oct. 4, 2019, (Year: 2019).
Machine Translation of Chinese First Action and Search Report, Appl. No. 201710232829.8, dated Feb. 3, 2020 (Year: 2020).
European Search Report, European Patent Application No. 17166123.4, dated Oct. 5, 2017, 9 Pages.
Decision of Rejection for TW Application No. 106112061 pp. 8, dated Feb. 26, 2018.
Decision of Rejection for TW Application No. 106112061 pp. 10, dated Jul. 30, 2018.
Chinese Second Action and Search Report, App No. 2020011439469.7, 16 Pages, dated Mar. 8, 2022.
Proximate definition, Dictionary.com, Sep. 28, 2022 (Year: 2022).
Chinese Third Action and Search Report, App No. 2020011439469.7, 7 Pages, dated Aug. 18, 2022.
Chinese Fourth Action and Search Report, App No. 2020011439469.7, 24 Pages, dated Feb. 20, 2023.
Tang, et al., "Guide for Designers of Plastic Articles", Dated Sep. 30, 1993, p. 175.

\* cited by examiner

CHAINRING

CROSS-REFERENCE TO RELATED APPLICATIONS (PROVISIONAL)

This application claims priority to and benefit of U.S. Provisional Patent Application No. 62/803,250 filed on Feb. 8, 2019, entitled "CHAINRING" by Klawer et al., and assigned to the assignee of the present application, the disclosure of which is hereby incorporated by reference in its entirety.

FIELD OF THE INVENTION

Embodiments of the invention generally relate to a chainring for a chain, belt, or shaft driven vehicle.

BACKGROUND

In a bicycle, such as a mountain bike, electric bike (eBike), or the like, a strong and rigid chainring is desired.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In the following discussion, the chainring is part of a vehicle drive assembly. For example, the chainring receives an input force (from an engine, a human working the pedals, or the like) that causes the chainring to rotate (at a certain speed, with a certain amount of force, etc.). The chainring is coupled to a transfer system (such as a roller chain, belt, shaft, or the like), which transfers the force from the chainring to the drive system (the transfer could be backward, forward, up, down, or a combination thereof. The drive system could be another chainring, a sprocket, a cassette, or the like which is mechanically coupled to at least one drive wheel. In so doing, at least a portion of the input force received at the chainring is ultimately transferred to the drive wheel (or wheels) thereby causing motion. In one example, e.g., a bike, the chainring is part of the crankset and is used to transfer power provided from the rider through the pedals to the rear (or driving) wheel. In another example, e.g., a motorized vehicle having at least one wheel, the chainring is mechanically coupled with the engine and is used to transfer power provided from the engine through the drive system to the rear (or driving) wheel (axle, or the like).

In one embodiment, the teeth on the chainring are designed and spaced to, typically, engage with openings in the links of a roller chain. In another embodiment, such as a belt drive (instead of chain drive), the teeth on the chainring are designed and spaced to, typically, engage with grooves or other features of a belt. In one embodiment, such as a shaft drive (instead of chain drive), a shaft is designed to couple with the outer diameter of the chainring.

Figure 1:
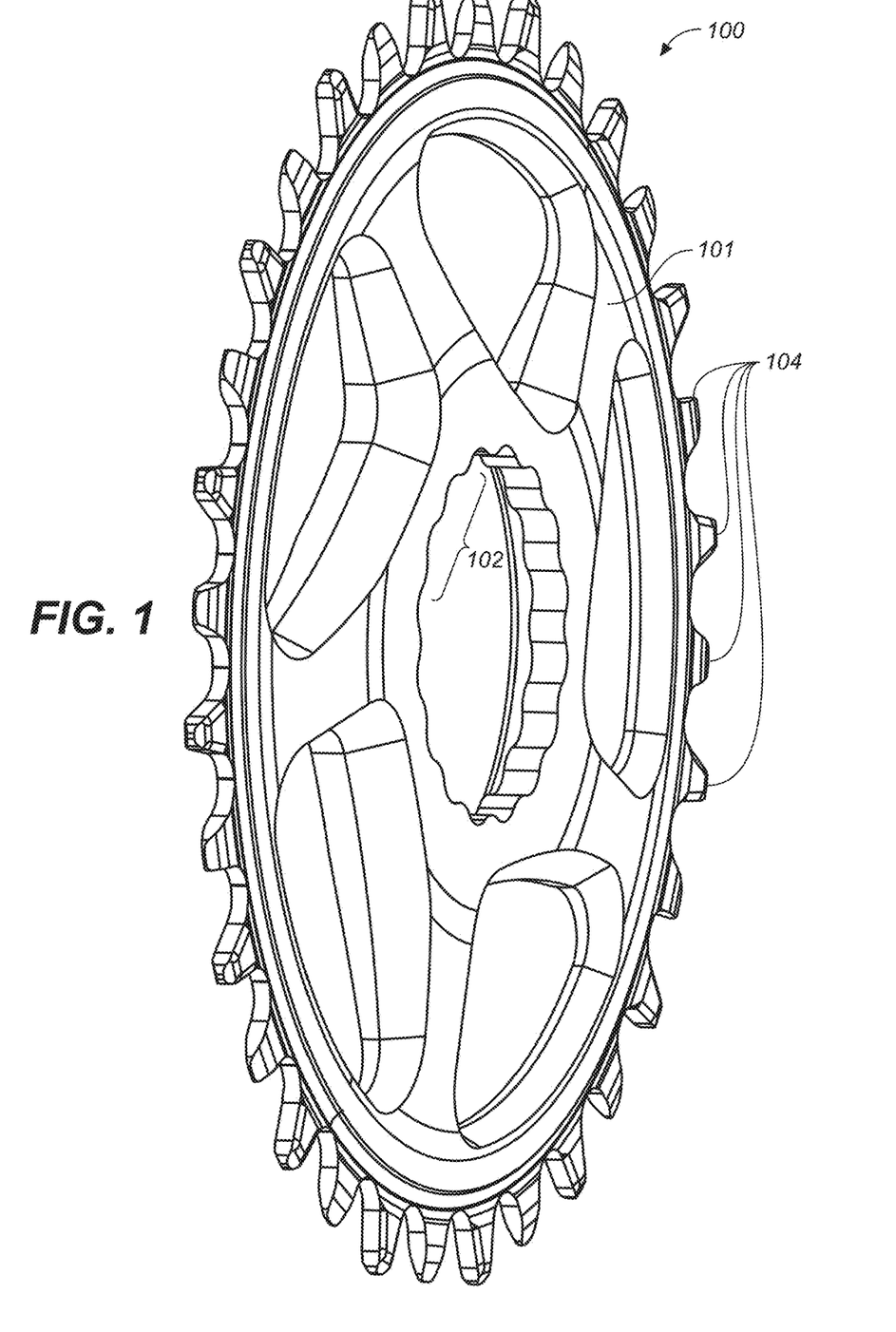
FIG. 1 is perspective view of a front (or outboard) surface of a chainring, in accordance with an embodiment.

FIG. 1 is a perspective view of a chainring 100, in accordance with an embodiment of the present invention. More specifically, FIG. 1 is a perspective view of the front surface 101 of the chainring 100. In one embodiment, chainring 100 consists of a single material such as aluminum, titanium, steel, or the like. In one embodiment, chainring 100 consists of a composite material such as injection molded carbon fiber, carbon fiber with reinforced nylon, compression molding, composite layering, nylon reinforced with carbon fibers, chopped carbon fibers, a plastic, polymer, other long fiber-reinforced plastics, or the like. In one embodiment, chainring 100 could be formed from a combination of the materials.

It will be noted that front surface 101 (sometimes referred to as the "outboard" surface) is, typically, the surface at which a crank arm of a crankset will engage with chainring 100. It will be understood that a crank set will typically include various components including, for example, but not limited to, pedals, pedal washers, preloader, dust caps, spindle spacers, bearings, hex nuts, preload adjusters, and the like. The various components of a crank set not shown in the present Figures for purposes of clarity and to avoid unnecessarily obscuring aspects and features of chainring 100.

Figure 10:
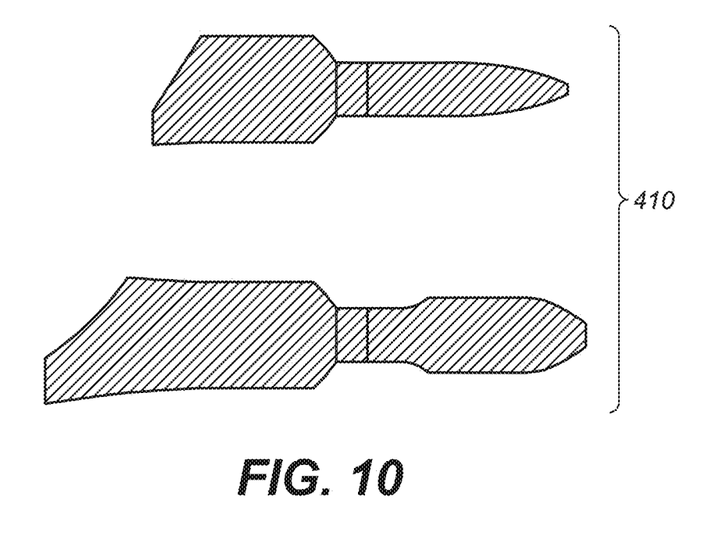
FIG. 10 is an enlarged view of view of FIG. 4, in accordance with an embodiment.

Further, in the embodiment of FIG. 1, chainring 100 includes an interface, having a typical portion thereof denoted as surface 102, for typically engaging with, for example, the crank arm of the crank set. It should be noted that, in the present chainring 100, surface 102 may also engage with a spindle, or any other portion of the crank set depending upon the particular configuration and components comprising the crank set. Chainring 100 also includes a plurality of teeth, typically shown as teeth 104, which are disposed about an outer perimeter of chainring 100. In one embodiment of chainring 100, the dimensions of teeth 104 very, alternately, from a thinner and more beveled tooth to a thicker and less beveled tooth. A specific example of measurements corresponding to such an alternating tooth configuration is shown at FIG. 10. It will be understood, however, that embodiments of the present chainring 100 are well suited to use with various tooth configurations, tooth patterns and/or tooth dimensions.

Figure 2:
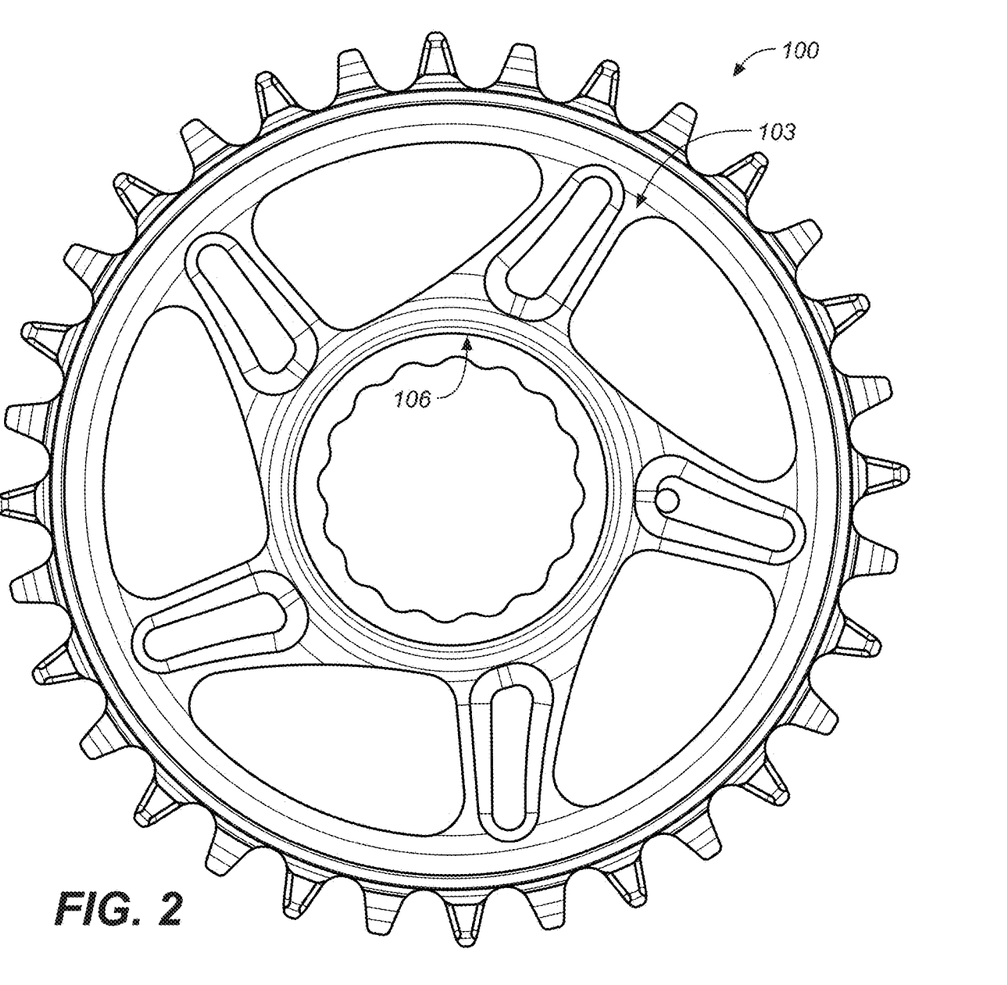
FIG. 2 is perspective view of a back (or inboard) surface of a chainring, in accordance with an embodiment.

With reference now to FIG. 2, a perspective view of a chainring 100 is provided, in accordance with an embodiment of the present invention. More specifically, FIG. 2 is a perspective view of the back surface 103 of chainring 100. It will be noted that back surface 103 (sometimes referred to as the "inboard" surface) includes a depressed region 106. Depressed region 106 of chainring 100 typically engages with, for example, the spindle of the crank set. It should be noted that, in the present chainring 100, depressed region 106 may also engage with any other portion of the crank set depending upon the particular configuration and components comprising the crank set.

In one embodiment, depressed region 106 of chainring 100 is depicted as formed within back surface 103. It is important to note that in various embodiments of the present invention, depressed region 106 may be formed in front surface 101. Further, in various embodiments of the present invention, a depressed region may be formed in both front surface 101 and back surface 103. Also, in various embodiments of the present invention, depressed region 106 (whether formed in one or more of front surface 101 and back surface 103) can be formed having a greater or lesser depth than depicted in FIG. 2. As a result, chainring 100 is well suited to embodiments in the location of depressed region 106 can be formed extending into either front surface 101 or back surface 103. Further, chainring 100 is well suited to embodiments in which the depth of depressed region 106 can vary from extending slightly into either front surface 101 or back surface 103, up to extending (into either front surface 101 or back surface 103) a distance which is nearly equal to the maximum thickness of chainring 100.

Figure 3:
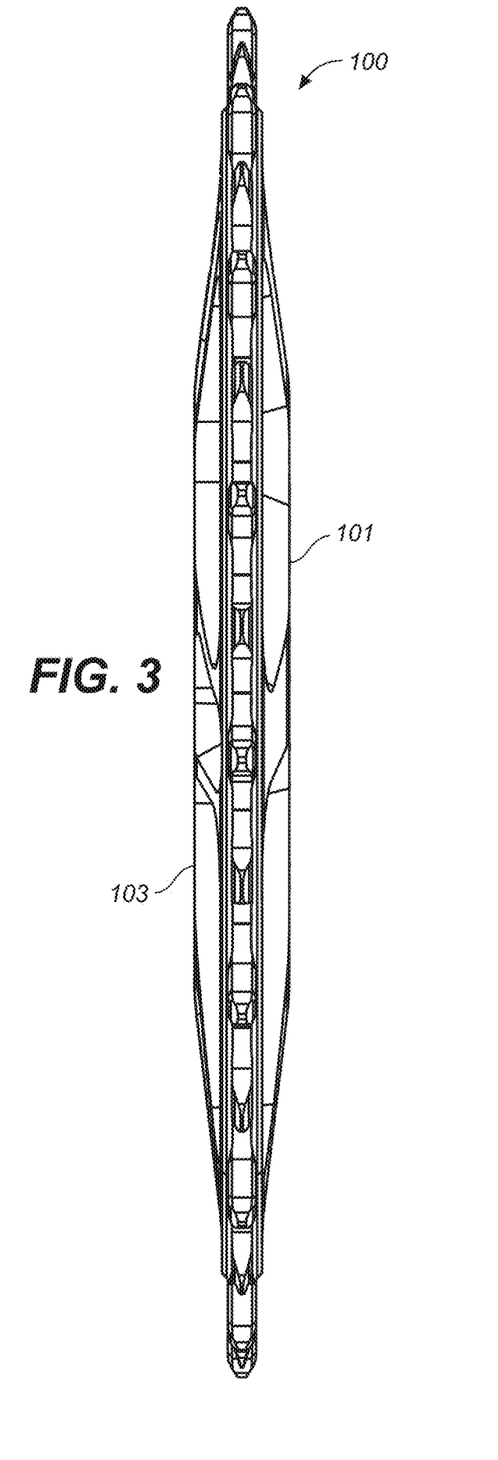
FIG. 3 is a side view of chainring, in accordance with an embodiment.

With reference now to FIG. 3, a side view of chainring 100 is provided. In the present embodiment, and as clearly depicted in FIG. 3, chainring 100 has a thickness which varies from a lesser thickness at the outer diameter (e.g., near teeth 104) to a greater thickness nearer the center (e.g., near surface 102) of chainring 100. Further, in one embodiment, the thickness of chainring 100 varies substantially the same on both front surface 101 and back surface 103. In such an embodiment, chainring 100 is substantially symmetric about a plane dividing front surface 101 and back surface 103 along the direction normal to the axial direction of chainring 100. Such varying thickness and substantially symmetrical shape provide increased lateral strength for chainring 100 as compared to conventional planar and/or non-substantially symmetrical chainrings. Additionally, the varying thickness and substantially symmetrical shape of chainring 100 achieve a substantially uniform rigidity with respect to both the inboard direction and the outboard direction when chainring 100 is in use.

Figure 4:
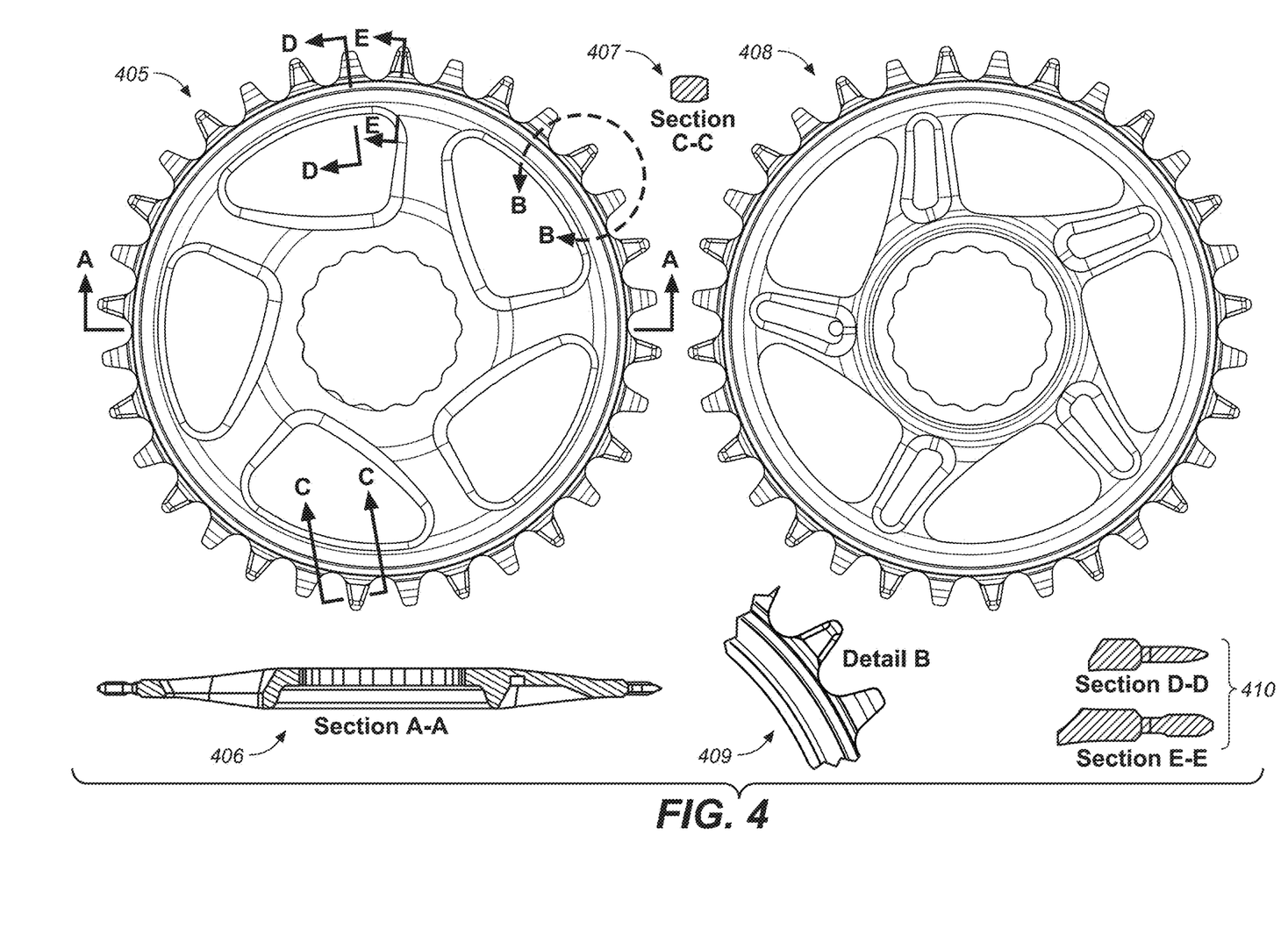
FIG. 4 is a diagram including a plurality of detailed views of a chainring and various portions of the chainring, in accordance with an embodiment.

Referring still to FIG. 3, and as shown in the various views of FIG. 4, in one embodiment, chainring 100 has a total maximum thickness of 9.5 millimeters. It will be understood that in another embodiment, the present chainring 100 may have a greater or lesser maximum thickness. Also, the varying thickness and substantially symmetrical shape of chainring 100 is well suited being formed by forging, forming, and/or casting processes. In one embodiment, chainring 100 is comprised of a single material such as aluminum, titanium, steel, or the like. In some embodiments, chainring 100 is comprised of a composite material such as injection molded carbon fiber, carbon fiber with reinforced nylon, compression molding, composite layering, nylon reinforced with carbon fibers, chopped carbon fibers, a plastic, polymer, other long fiber-reinforced plastics, or the like. In some embodiments, chainring 100 is formed from a combination of materials such as, for example, a single material for teeth 104 and an inner composite material for the remainder of chainring 100. In one such embodiment, the single material will have a higher modulus of elasticity than that of the composite material.

With reference now to FIG. 4, a diagram including a plurality of detailed views of chainring 100 and various portions of chainring 100 is provided, in accordance with an embodiment. In the plurality of views of FIG. 4 (and also in FIGS. 5-10) various measurements are provided for components and features of chainring 100. Although such measurements are shown for chainring 100, it should be appreciated that the provided measurements comprise one or more embodiments and that the measurements of the components and features of chainring 100 can be adjusted based upon, for example, user preferences, performance needs, application requirements (e.g., on-road, downhill, offroad, uphill, etc.), vehicle frame size, and the like.

Figure 5:
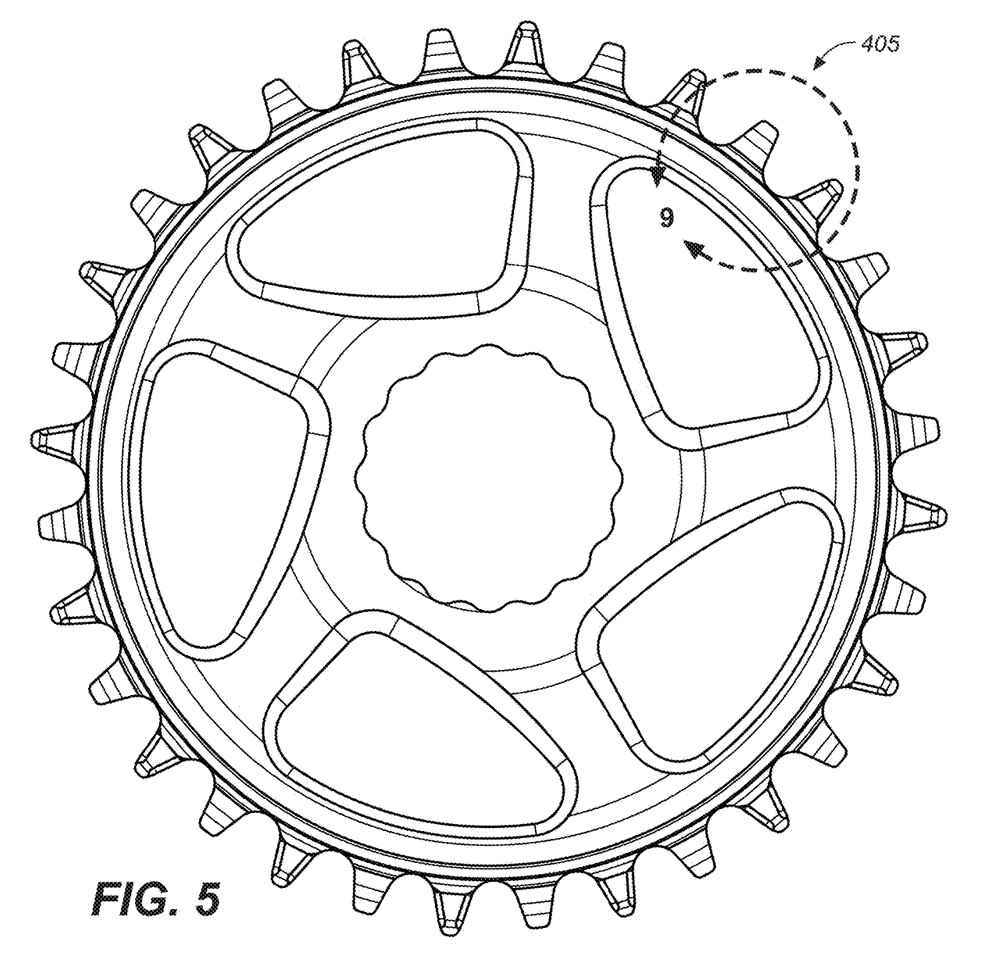
FIG. 5 is an enlarged view of view of FIG. 4, in accordance with an embodiment.

FIG. 5 is an enlarged view of view 405 of FIG. 4 including a number of measurements for features and aspects of front surface 101 of chainring 100. Although a number of measurements are provided in FIG. 5, it should be appreciated that the provided measurements comprise one embodiment and that one or more of the measurements could be adjusted and/or modified as stated above.

Figure 6:
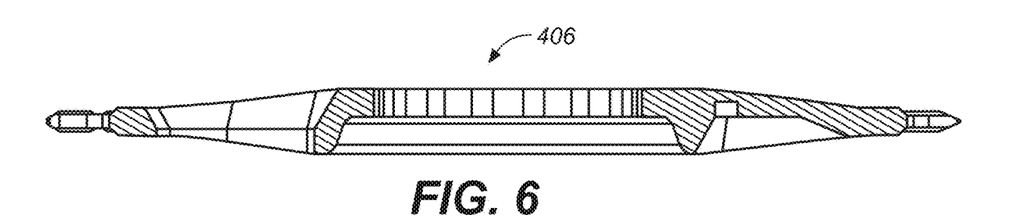
FIG. 6 is an enlarged view of view of FIG. 4, in accordance with an embodiment.

FIG. 6 is an enlarged view of view 406 of FIG. 4 including a number of measurements for features and aspects readily depicted in a side view of chainring 100. Although a number of measurements are provided in FIG. 6, it should be appreciated that the provided measurements comprise one embodiment and that one or more of the measurements could be adjusted and/or modified as stated above.

Figure 7:
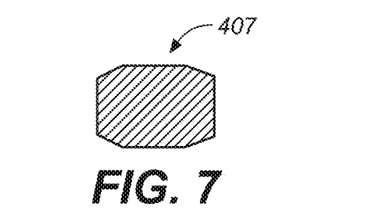
FIG. 7 is an enlarged view of view of FIG. 4, in accordance with an embodiment.

FIG. 7 is an enlarged view of view 407 of FIG. 4 including a plan view of tooth 104 of chainring 100 and a measurement for features and aspects related to the beveled shape of tooth 104. Although such a measurement is provided in FIG. 7, it should be appreciated that the provided measurement comprises one embodiment and that the measurement could be adjusted and/or modified as stated above.

Figure 8:
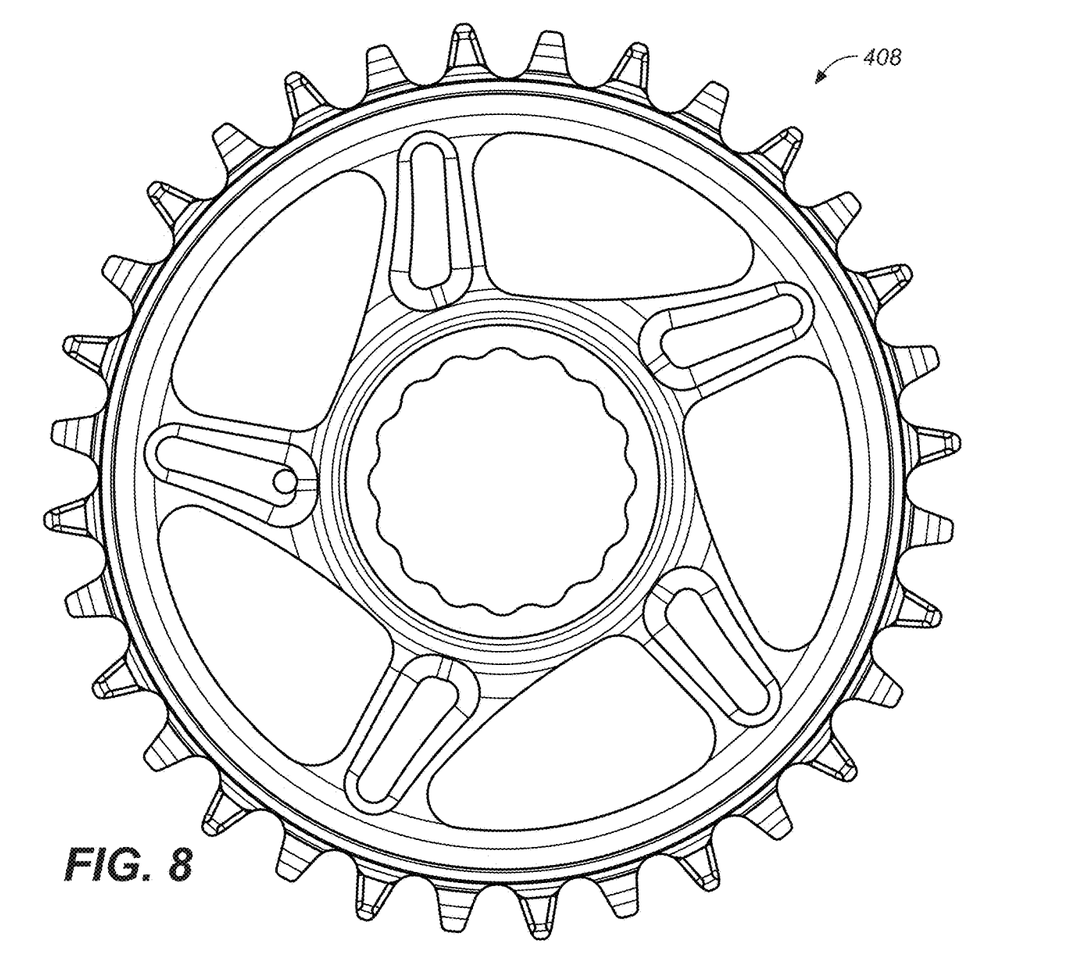
FIG. 8 is an enlarged view of view of FIG. 4, in accordance with an embodiment.

FIG. 8 is an enlarged view of view 408 of FIG. 4 including a description of a formation process for a feature of back surface 103 of chainring 100. Although a particular formation process is provided in FIG. 8, it should be appreciated that the feature can be formed in any of numerous other formation processes.

Figure 9:
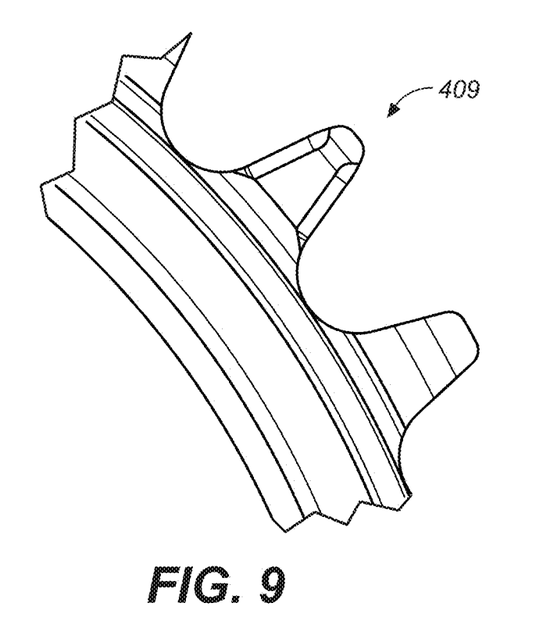
FIG. 9 is an enlarged view of view of FIG. 4, in accordance with an embodiment.

FIG. 9 is an enlarged view of view 409 of FIG. 4 including a number of measurements for teeth 104 of chainring 100 and a measurement for features and aspects related to teeth 104. Although such measurements are provided in FIG. 9, it should be appreciated that the provided measurements comprises one embodiment and that the measurements could be adjusted and/or modified as stated above.

FIG. 10 is an enlarged view of view 410 of FIG. 4 including a number of measurements for teeth 104 of chainring 100 and measurements for features and aspects related to teeth 104. Although such measurements are provided in FIG. 10, it should be appreciated that the provided measurements comprises one embodiment and that the measurements could be adjusted and/or modified as stated above.

Figure 11:
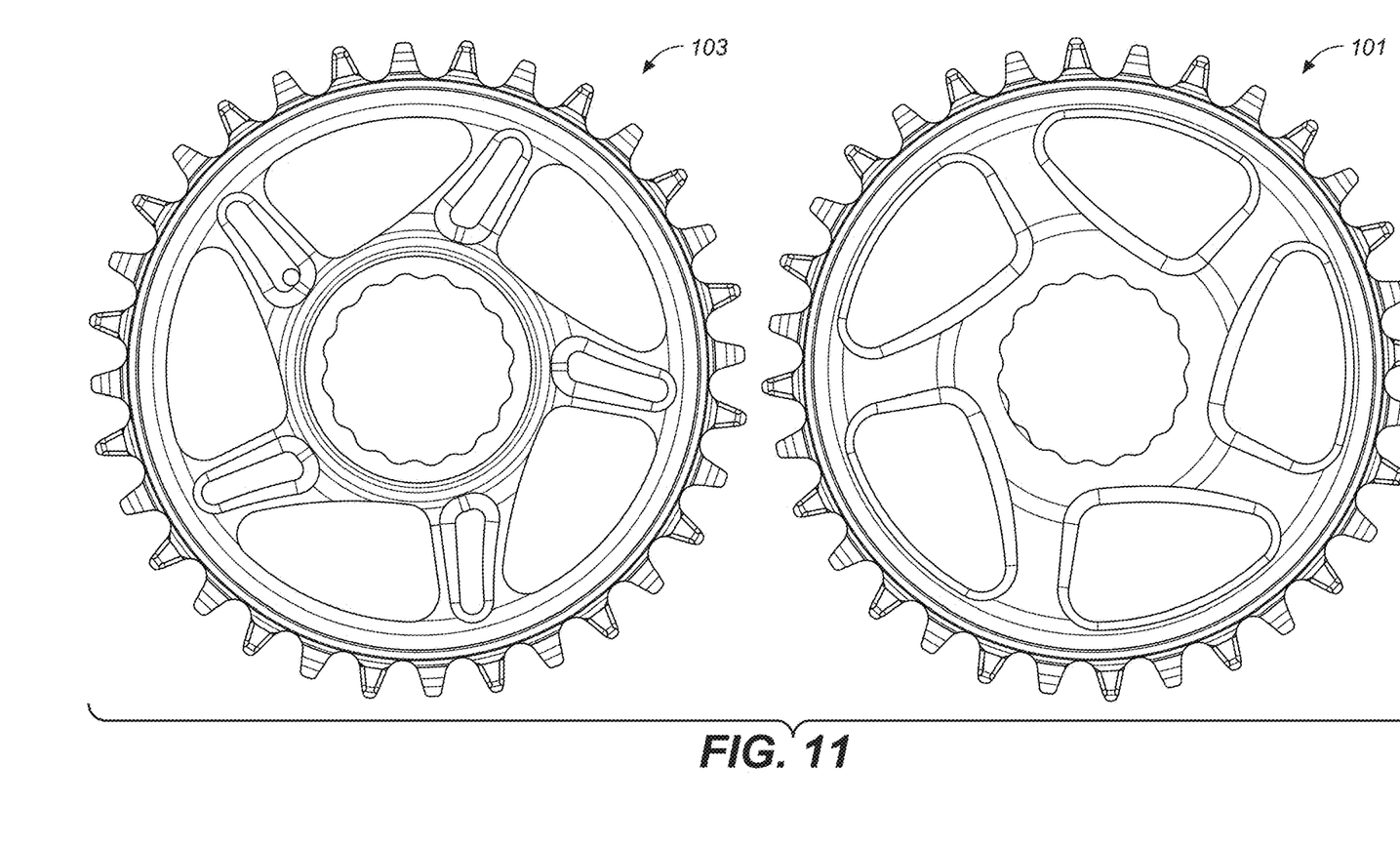
FIG. 11 includes a plan view of the back surface of a chainring and a plan view of the front surface of a chainring, in accordance with an embodiment.

FIG. 11 is a perspective view of a chainring 100, in accordance with an embodiment of the present invention. More specifically, FIG. 11 is a perspective view of the front surface 101 of the chainring 100 and a perspective view of the back surface 103 of chainring 100.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter is not necessarily limited to the specific features or acts described above. Rather, the specific features and acts described above are disclosed by way of illustration and as example forms of implementing the described invention.

What we claim is:

1. A chainring comprising:
    a front surface;
    a back surface;
    a center;
    an outer diameter, wherein said chainring has a thickness which varies from a lesser thickness at said outer diameter to a greater thickness nearer said center, said thickness of said chainring varying substantially the same on said front surface and said back surface such that said chainring is substantially symmetric about a plane dividing said front surface and said back surface along a direction normal to an axial direction of said chainring;
    an opening in said center of said chainring, said opening for fixedly coupling said chainring with a crank arm to form a drive side of a crank assembly; and
    a depressed region about an inner diameter of said chainring and adjacent to said opening in said center of said chainring, said depressed region to engage with a spindle of a crank set of said crank assembly.

2. The chainring of claim 1, further comprising:
    a plurality of teeth about a circumference of said outer diameter of said chainring.

3. The chainring of claim 2, wherein said plurality of teeth are designed and spaced to engage with openings in links of a roller chain in a chain drive application.

4. The chainring of claim 2, wherein said plurality of teeth are designed and spaced to engage with features of a belt in a belt drive application.

5. The chainring of claim 2, wherein said plurality of teeth are radially beveled, such that they are thicker toward a base of said plurality of teeth and thinner toward a tip of said plurality of teeth.

6. The chainring of claim 2, wherein dimensions of said plurality of teeth alternate between a thinner and more beveled tooth and a thicker and less beveled tooth.

7. The chainring of claim 1, further comprising:
    a shaft coupled with said outer diameter of said chainring, said shaft designed to couple with a portion of said outer diameter of said chainring.

8. The chainring of claim 1, wherein said greater thickness of said chainring is approximately 9.5 millimeters.

9. A bicycle chainring comprising:
    a front surface;
    a back surface;
    a center;
    an outer diameter, wherein said bicycle chainring has a thickness which varies from a lesser thickness at said outer diameter to a greater thickness nearer said center, said thickness of said bicycle chainring substantially similar at a cross-section of said front surface and said back surface such that said chainring is substantially symmetric about a plane dividing said front surface and said back surface along a direction normal to an axial direction of said bicycle chainring;
    an opening in said center of said bicycle chainring, said opening for fixedly coupling said bicycle chainring with a crank arm to form a drive side of a crank assembly; and
    a depressed region about an inner diameter of said bicycle chainring and adjacent to said opening in said center of said bicycle chainring, said depressed region to engage with another portion of said crank assembly, wherein said depressed region extends into said front surface of said chainring.

10. The bicycle chainring of claim 9, further comprising:
    a plurality of teeth about a circumference of said outer diameter of said bicycle chainring, said plurality of teeth designed and spaced to engage with openings in links of a roller chain in a chain drive system.

11. The bicycle chainring of claim 9, further comprising:
    a plurality of teeth about a circumference of said outer diameter of said bicycle chainring, said plurality of teeth designed and spaced to engage with features of a belt in a belt drive system.

12. A chainring comprising:
    a front surface;
    a back surface;
    a center;
    an outer diameter, wherein said chainring has a thickness which varies from a lesser thickness at said outer diameter to a greater thickness nearer said center, said thickness of said chainring varying substantially the same on said front surface and said back surface such that said chainring is substantially symmetric about a plane dividing said front surface and said back surface along a direction normal to an axial direction of said chainring;
    an opening in said center of said chainring, said opening for fixedly coupling said chainring with a crank arm to form a drive side of a crank assembly; and
    a depressed region about an inner diameter of said chainring and adjacent to said opening in said center of said chainring, said depressed region extends into said front surface of said chainring.

* * * * *